United States Patent
Chen et al.

(10) Patent No.: US 12,066,746 B2
(45) Date of Patent: Aug. 20, 2024

(54) INTELLIGENT LIGHT SUPPLEMENT DEVICE, VIDEO APPARATUS AND INTELLIGENT LIGHT SUPPLEMENT METHOD THEREOF

(71) Applicant: Aver Information Inc., New Taipei (TW)

(72) Inventors: Chih-Kang Chen, New Taipei (TW); Jhe-Wei Jhan, New Taipei (TW); Chun-Ping Wang, New Taipei (TW); Te-Hua Lee, New Taipei (TW)

(73) Assignee: AVER INFORMATION INC., New Taipei (TW)

( * ) Notice: Subject to any disclaimer, the term of this patent is extended or adjusted under 35 U.S.C. 154(b) by 263 days.

(21) Appl. No.: 17/679,184

(22) Filed: Feb. 24, 2022

(65) Prior Publication Data

US 2022/0283479 A1     Sep. 8, 2022

(30) Foreign Application Priority Data

Mar. 3, 2021 (TW) ................................. 110107504

(51) Int. Cl.
*G03B 15/03* (2021.01)
*H05B 47/11* (2020.01)

(52) U.S. Cl.
CPC ............. *G03B 15/03* (2013.01); *H05B 47/11* (2020.01)

(58) Field of Classification Search
None
See application file for complete search history.

(56) References Cited

U.S. PATENT DOCUMENTS

| 5,712,535 A * | 1/1998 | Ogawa | H04N 5/772 |
| | | | 348/E5.029 |
| 9,313,855 B1 * | 4/2016 | Sivertsen | H05B 47/11 |
| 2010/0189429 A1 * | 7/2010 | Butterworth | G03B 15/05 |
| | | | 396/155 |

FOREIGN PATENT DOCUMENTS

| CN | 104428829 A | 3/2015 | |
| CN | 111988531 A * | 11/2020 | ............... F21K 9/62 |
| TW | 201432646 A | 8/2014 | |

* cited by examiner

*Primary Examiner* — Rodney E Fuller
(74) *Attorney, Agent, or Firm* — McClure, Qualey & Rodack, LLP

(57) ABSTRACT

An intelligent light supplement device, video apparatus, and an intelligent light supplement method are disclosed. The intelligent light supplement device includes a light source input module, a light source computing module, and a light source output module. The light source input module has a light sensing unit, which receives an ambient light source. The light source computing module is electrically connected to the light source input module, compares the ambient light source with a content of an illuminance comparison table to generate an illuminance control signal corresponding to an apparatus illuminance value, and/or compares the ambient light source with a content of a color temperature comparison table to generate a color temperature control signal corresponding to an apparatus color temperature value. The light source output module has a light emitting unit and drives the light emitting unit according to the illuminance control signal and/or the color temperature control signal.

9 Claims, 4 Drawing Sheets

INTELLIGENT LIGHT SUPPLEMENT DEVICE, VIDEO APPARATUS AND INTELLIGENT LIGHT SUPPLEMENT METHOD THEREOF

CROSS REFERENCE TO RELATED APPLICATIONS

This Non-provisional application claims priority under 35 U.S.C. § 119(a) on Patent Application No. 110107504 filed in Republic of China on Mar. 3, 2021, the entire contents of which are hereby incorporated by reference.

BACKGROUND

1. Technical Field

The invention relates to a light supplement device applied to video and a light adjustment method thereof, particularly to an intelligent light supplement device, a video apparatus, and an intelligent light supplement method thereof.

2. Description of Related Art

Due to the rapid technological development of the video apparatus, the way of working has also gradually changed. People can choose their favorite comfortable places to work, such as working from home or in a coffee shop. However, such comfortable places usually use softer lighting configurations, and some are even close to dim low-light environments. Therefore, when a video conference is performed in such an environment, there is often a large area of shadow on the face due to insufficient light which makes the image unclear.

In order to improve the problem of low light source, some users will use a fill light to increase the brightness. However, if the brightness is not adjusted properly, it may result in a worse image. For example, if the brightness is too weak, the local shadow area may increase instead, and too strong brightness may overexpose the image and it will also irritate the eyes of the user.

Therefore, how to provide an intelligent light supplement device, the video apparatus, and an intelligent light supplement method thereof to dynamically adjust the light compensation according to the ambient light source where the user is located is one of the important subject matters.

SUMMARY OF THE INVENTION

In view of the foregoing, one of the objects of the invention is to provide an intelligent light supplement device, a video apparatus, and an intelligent light supplement method thereof, which can output a suitable light source according to the different ambient light source to fill light on the object.

Another object of the invention is to provide an intelligent light supplement device, a video apparatus, and an intelligent light supplement method thereof, which can reduce the irritation of the eyes of the user caused by the light supplement source when the light supplement device is used to supplement the light for the object.

To achieve the above, the invention provides an intelligent light supplement method for a video apparatus. The video apparatus has a camera, a light sensing unit, and a light emitting unit. Among them, the camera and the light sensing unit are arranged in the same direction. The intelligent light supplement method includes steps 1 to 6. Step 1 is to detect an ambient light source by the light sensing unit. Step 2 is to obtain a plurality of ambient illumination sensing values and a plurality of ambient color temperature sensing values according to the ambient light source. Step 3 is to sample the ambient illumination sensing values and the ambient color temperature sensing values to obtain a plurality of ambient illuminance sample values and a plurality of ambient color temperature sample values. Step 4 is to establish an illuminance comparison table according to the ambient illuminance sample values and a plurality of apparatus illuminance values and establish a color temperature comparison table according to the ambient color temperature sample values and a plurality of apparatus color temperature values. Step 5 is to determine whether to adjust the apparatus illuminance value and/or the apparatus color temperature value of the light emitting unit according to the ambient illumination sensing values and the ambient color temperature sensing values. Step 6 is to select the corresponding apparatus illuminance value and/or the apparatus color temperature value from the illuminance comparison table and/or the color temperature comparison table and drive the light emitting unit accordingly if the adjustment is required.

In one embodiment, the step of sampling from the ambient illumination sensing values and the ambient color temperature sensing values, further includes excluding the extreme ambient illumination sensing value in the ambient illumination sensing values and excluding the extreme ambient color temperature sensing values in the ambient color temperature sensing values.

In one embodiment, the apparatus illuminance value selected from the illuminance comparison table is a target apparatus illuminance value, and the light emitting unit is gradually adjusted from a current illuminance to a target illuminance corresponding to the target apparatus illuminance value. In addition, the apparatus color temperature value selected from the color temperature comparison table is a target apparatus color temperature value, and the light emitting unit is gradually adjusted from a current color temperature to a target color temperature corresponding to the target apparatus color temperature value.

In one embodiment, the intelligent light supplement method further includes correspondingly adjusting the relationship between the ambient illuminance sample values and the apparatus illuminance values in the illuminance comparison table after receiving an external illumination adjustment command. In addition, the intelligent light supplement method may further includes correspondingly adjusting the relationship between the ambient color temperature sample values and the apparatus color temperature values in the color temperature comparison table after receiving an external color temperature adjustment command.

In one embodiment, the intelligent light supplement method further includes calibrating the light sensing unit, and the calibration step includes providing a calibration light source in a sensing range of the light sensing unit, which has a calibrated illuminance value and a calibrated color temperature value; capturing a target ambient light source in the environment of the calibration light source by the light sensing unit; converting the target ambient light source into a calibrated ambient illumination sensing value and a calibrated ambient color temperature sensing value according to a calibration transition condition; and comparing the calibrated ambient illumination sensing value with the calibrated illuminance value and comparing the calibrated ambient color temperature sensing value with the calibrated color temperature value.

In one embodiment, the intelligent light supplement method further includes adjusting an illuminance conversion parameter of the calibration transition condition when the tolerance value between the calibrated ambient illumination sensing value and the calibrated illuminance value exceeds a preset illumination tolerance value; and adjusting a color temperature conversion parameter of the calibration transition condition when the tolerance value between the calibrated ambient color temperature sensing value and the calibrated color temperature value exceeds a preset color temperature tolerance value.

In addition, to achieve the above, the invention provides a video apparatus with light compensation function, which includes an image capturing module, a light source input module, a light source computing module, and a light source output module. The image capturing module has a camera, which is disposed towards a first direction and captures the image of the first direction. The light source input module has a light sensing unit, which is disposed in the same direction as the image capturing module and receives the ambient light source. The light source computing module is electrically connected to the light source input module and compares the ambient light source with a content of an illuminance comparison table to generate an illuminance control signal corresponding to an apparatus illuminance value and/or compares the ambient light source with a content of a color temperature comparison table to generate a color temperature control signal corresponding to an apparatus color temperature value. The light source output module has a light emitting unit. The light source output module drives the light emitting unit according to the illuminance control signal and/or the color temperature control signal.

Furthermore, to achieve the above, the invention provides an intelligent light supplement device, which includes a light source input module, a light source computing module, and a light source output module. The light source input module has a light sensing unit, which receives an ambient light source. The light source computing module is electrically connected to the light source input module and compares the ambient light source with a content of an illuminance comparison table to generate an illuminance control signal corresponding to an apparatus illuminance value and/or compares the ambient light source with a content of a color temperature comparison table to generate a color temperature control signal corresponding to an apparatus color temperature value. The light source output module has a light emitting unit, and the light source output module drives the light emitting unit according to the illuminance control signal and/or the color temperature control signal.

In one embodiment, the light source input module further includes a control unit, which is electrically connected with the light sensing unit and the light source computing module respectively. The control unit transmits the ambient light source to the light source computing module and receives and outputs the illuminance control signal and/or the color temperature control signal transmitted by the light source computing module.

In one embodiment, the light source output module further includes a rheostat unit and a power conversion unit. The rheostat unit is electrically connected to the control unit and receives the illuminance control signal and/or the color temperature control signal. The power conversion unit is electrically connected to a power supply module, the rheostat unit, and the light emitting unit, respectively. The power conversion unit outputs a driving power to drive the light emitting unit according to the output of the rheostat unit and the output of the power supply module.

As mentioned above, the video apparatus, the intelligent light supplement device, and the intelligent light supplement method of the invention utilize the light sensing unit to detect the ambient light source when the video apparatus is used and actively adjust the illuminance and color temperature of the light emitting unit according to the illuminance and color temperature of the ambient light source. Accordingly, when performing video communication in a low light source environment, the lighting compensation can be dynamically adjusted to clear the object and can reduce eye irritation from the light emitting unit.

The detailed technology and preferred embodiments implemented for the subject invention are described in the following paragraphs accompanying the appended drawings for people skilled in this field to well appreciate the features of the claimed invention.

BRIEF DESCRIPTION OF THE DRAWINGS

The parts in the drawings are not necessarily drawn to scale, the emphasis instead being placed upon clearly illustrating the principles of at least one embodiment. In the drawings, like reference numerals designate corresponding parts throughout the various diagrams, and all the diagrams are schematic.

DETAILED DESCRIPTION

The following disclosures, with reference to corresponding figures, provide detail descriptions for preferable embodiments of the pairing and interconnecting method for electronic devices in the present invention. Furthermore, reference will be made to the drawings to describe various inventive embodiments of the present disclosure in detail, wherein like numerals refer to like elements throughout.

Figure 1:
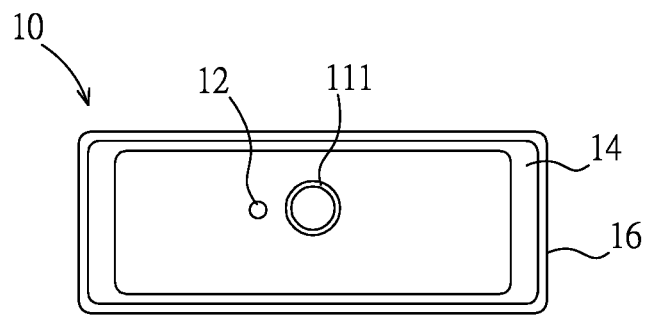
FIG. 1 is a schematic diagram showing the appearance of the video apparatus according to a preferred embodiment of the invention.
Figure 2:
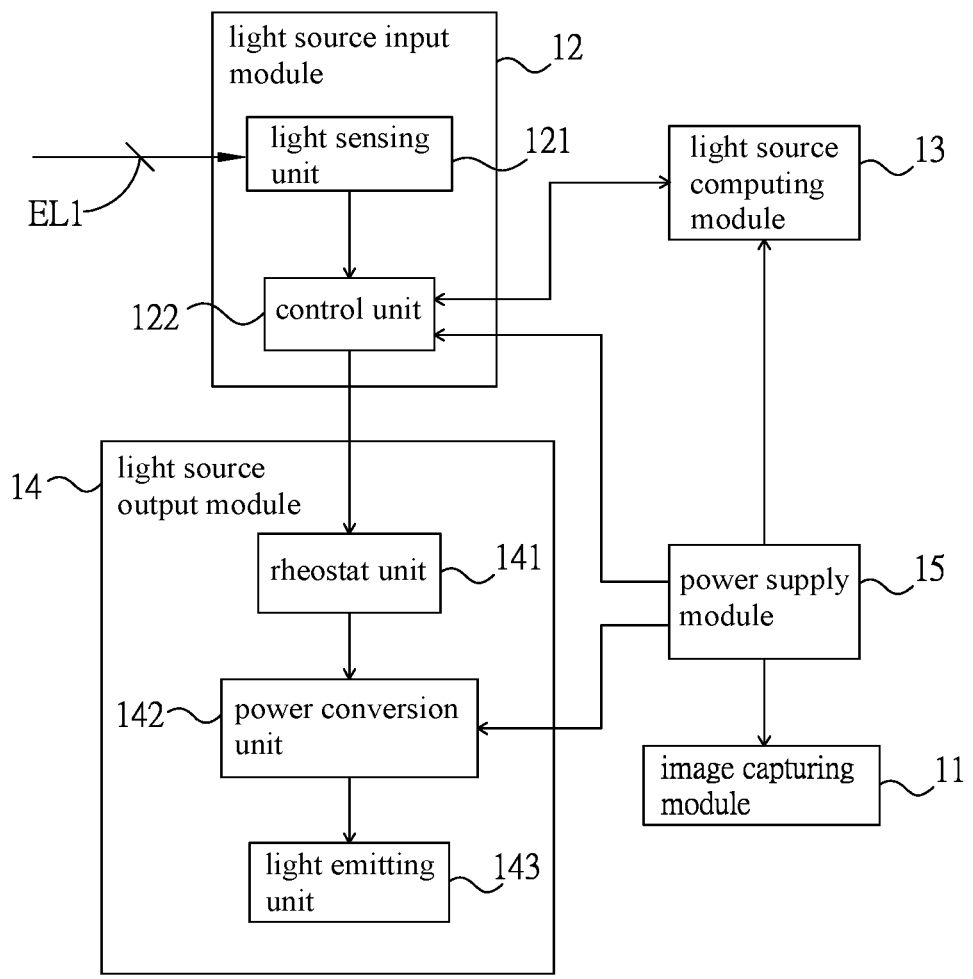
FIG. 2 is a schematic block diagram showing the structure of the video apparatus according to the preferred embodiment of the invention.

Please refer to FIG. 1 and FIG. 2, a video apparatus 10 according to a preferred embodiment of the invention includes an image capturing module 11, a light source input module 12, a light source computing module 13, a light source output module 14, a power supply module 15, and a housing 16. The power supply module 15 is electrically connected to the image capturing module 11, the light source input module 12, the light source computing module 13, and the light source output module 14, respectively and provides appropriate power for their operation. In addition, the image capturing module 11, the light source input module 12, the light source computing module 13, the light source output module 14, and the power supply module 15 can be accommodated in the housing 16. In other embodiments, the power supply module 15 can be disposed outside the housing 16 and connected to a power terminal exposed in the housing 16 through a power cord to provide power.

The image capturing module 11 has a camera 111, which is arranged toward a first direction and captures images in the first direction. The image capturing module 11 is, for example, a camera module, and the camera 111 is, for example, a lens. In addition, the camera module may also have other necessary components, such as a lens holder, an image sensor, a VCM, and a driving unit . . . etc.

The light source input module 12 has a light sensing unit 121 and a control unit 122 that are electrically connected to each other. The light sensing unit 121 is, for example, a color sensor, which is disposed in the same direction as the image capturing module 11 and receives the ambient light source EL1. In short, the ambient light source EL1 obtained by the light sensing unit 121 is the same as the ambient light source EL1 obtained by the image capturing module 11. Among them, the ambient light source EL1 includes at least two parameters, illuminance and color temperature. In the embodiment, the light sensing unit 121 can obtain a plurality of ambient illumination sensing values and a plurality of ambient color temperature sensing values through the continuously received ambient light source that are respectively transmitted to the control unit 122.

The light source computing module 13 is electrically connected to the light source input module 12. The light source computing module 13 may generate an illuminance control signal corresponding to a apparatus illuminance value according to compare the ambient illumination sensing value of the ambient light source with the content of an illuminance comparison table. In addition, the light source computing module 13 may generate a color temperature control signal corresponding to an apparatus color temperature value according to compare the ambient color temperature sensing value of the ambient light source with the content of a color temperature comparison table. In the embodiment, the light source computing module 13 is presented in the type of a system on chip (SOC), which is electrically connected to the control unit 122. After receiving the ambient illumination sensing value, the light source computing module 13 will operate it and then output the illuminance control signal corresponding to the apparatus illuminance value to the control unit 122. In addition, after receiving the ambient color temperature sensing value, the light source computing module 13 will operate it and then output the color temperature control signal corresponding to the apparatus color temperature value to the control unit 122. It should be noted that the above-mentioned operations on the illuminance and the color temperature may be performed simultaneously, but it is also possible to perform only the correlation operation of the illuminance or only the correlation operation of the color temperature.

Here, the content of the illuminance comparison table records the correspondence between a illuminance sensing value of the ambient light source and the apparatus illuminance value and the content of the color temperature comparison table records the correspondence between a color temperature sensing value of the ambient light source and the apparatus color temperature value. It should be further explained that the so-called illuminance sensing value of the ambient light source in the illuminance comparison table is an illuminance sampling value of the ambient light source obtained by sampling when the comparison table is established. In addition, the so-called color temperature sensing value of the ambient light source in the color temperature comparison table is a color temperature sampling value of the ambient light source obtained by sampling when the comparison table is established. Among them, the apparatus illuminance value represents the level of the light source illuminance generated by the light source output module 14 of the video apparatus 10, and each level corresponds to one illuminance generated by the light source output module 14. In addition, the apparatus color temperature value represents the level of the light source color temperature generated by the light source output module 14 of the video apparatus 10, and each level corresponds to one color temperature generated by the light source output module 14. In other embodiments, the content of the comparison table and its corresponding manner can be designed according to actual requirements.

The light source output module 14 is electrically connected to the light source input module 12 and receives the illuminance control signal corresponding to the apparatus illuminance value and/or the color temperature control signal corresponding to the apparatus color temperature value transmitted by the control unit 122. In the embodiment, the light source output module 14 has a rheostat unit 141, a power conversion unit 142, and a light emitting unit 143.

The rheostat unit 141 is electrically connected to the control unit 122 and receives the illuminance control signal corresponding to the apparatus illuminance value and the color temperature control signal corresponding to the apparatus color temperature value. The rheostat unit 141 can output a corresponding control signal according to the illuminance control signal and the color temperature control signal.

The power conversion unit 142 is electrically connected to the rheostat unit 141 and the power supply module 15, respectively. The power conversion unit 142 is, for example, a DC-to-DC converter, which outputs a driving power according to the power provided by the power supply module 15. The power conversion unit 142 can adjust the level of the driving power according to the control signal generated by the rheostat unit 141. In other words, the rheostat unit 141 can be, for example, a digital potentiometer or a PWM generator.

The light emitting unit 143 is electrically connected to the power conversion unit 142 and emits light according to the driving power to generate a device light source. The light emitting unit 143, for example, includes at least one LED, which may include any one of a white LED, a red LED, a green LED, and a blue LED, or any combination thereof, which is not limited herein.

Based on the above, the video apparatus 10 can detect the ambient light source through the light sensing unit 121, can obtain the ambient illuminance and the ambient color temperature of the user under the current light source that is compared with the content of the illuminance comparison table and the color temperature comparison table, respectively, and then the light source computing module 13 can be used to determine whether the illuminance or color temperature of the light emitting unit needs to be adjusted. For example, when the ambient light source becomes dim and has a low color temperature (e.g., yellow light), the light emitting unit 143 of the light source output module 14 can reduce the illuminance to compensate for the light received by the subject, and reduce the irritation of the light emitting unit 143 to the eyes of the user. In addition, the light emitting unit 143 can generate a light source with a higher color temperature to balance the low color temperature of the environment, so that the object image captured by the image capturing module 11 can have better image quality. Accordingly, the aforementioned light source input module 12, the light source computing module 13, and the light source output module 14 could be referred to as the intelligent light supplement device.

Figure 3:
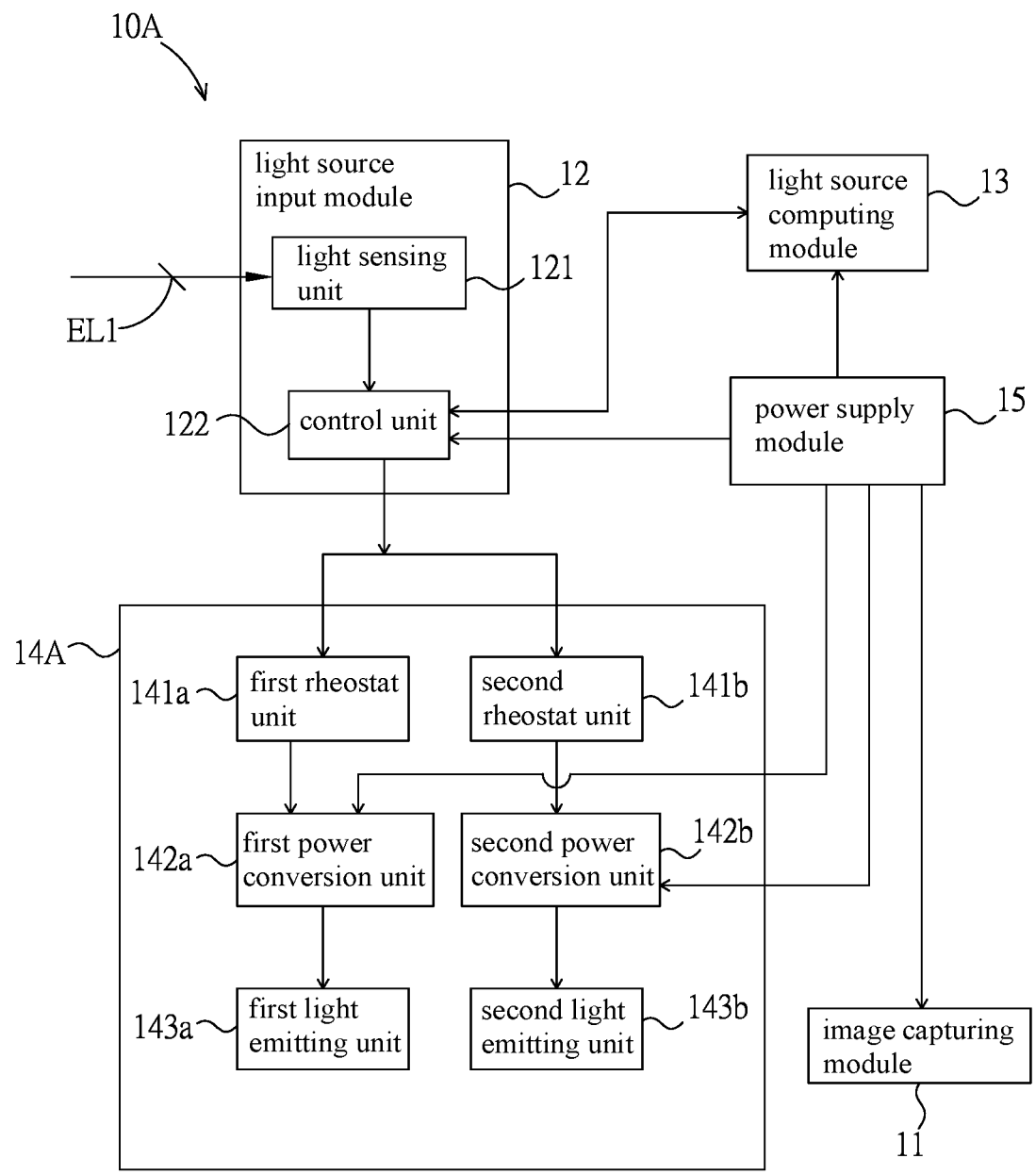
FIG. 3 is a schematic block diagram showing the structure of the video apparatus according to another embodiment of the invention.

The above description is described by taking the light source output module 14 having a single light emitting unit 143 as an example. In other embodiments, different numbers of the light emitting units may be combined according to different applications and light adjusting method. Next, please refer to FIG. 3, the video apparatus 10A is different from the aforementioned video apparatus 10 in that the light source output module 14A has a first rheostat unit 141*a*, a first power conversion unit 142*a*, a first light emitting unit 143*a*, a second rheostat unit 141*b*, a second power conversion unit 142*b*, and a second light emitting unit 143*b*.

The first rheostat unit 141*a* and the second rheostat unit 141*b* are electrically connected to the control unit 122 of the light source input module 12, respectively to receive the illuminance control signal or the color temperature control signal output by the light source computing module 13 and transmitted by the control unit 122.

The first power conversion unit 142*a* is electrically connected to the first rheostat unit 141*a* and the first light emitting unit 143*a* respectively. The second power conversion unit 142*b* is electrically connected to the second rheostat unit 141*b* and the second light emitting unit 143*b*, respectively. In the embodiment, the first light emitting unit 143*a* is, for example, a high color temperature light emitting unit and the second light emitting unit 143*b* is, for example, a low color temperature light emitting unit. After being driven by the appropriate illuminance control signal and the color temperature control signal, respectively, the high color temperature light emitting unit and the low color temperature light emitting unit can be mixed to generate an appropriate device light source. It should be noted that the light source respectively generated by the first light emitting unit 143*a* and the second light emitting unit 143*b* can also be outputted after passing through a light mixing unit. Wherein, the composition of the light mixing unit includes, but is not limited to, a light guide plate, a diffuser plate, a Fresnel lens, etc., so as to output a uniform light source.

Figure 4:
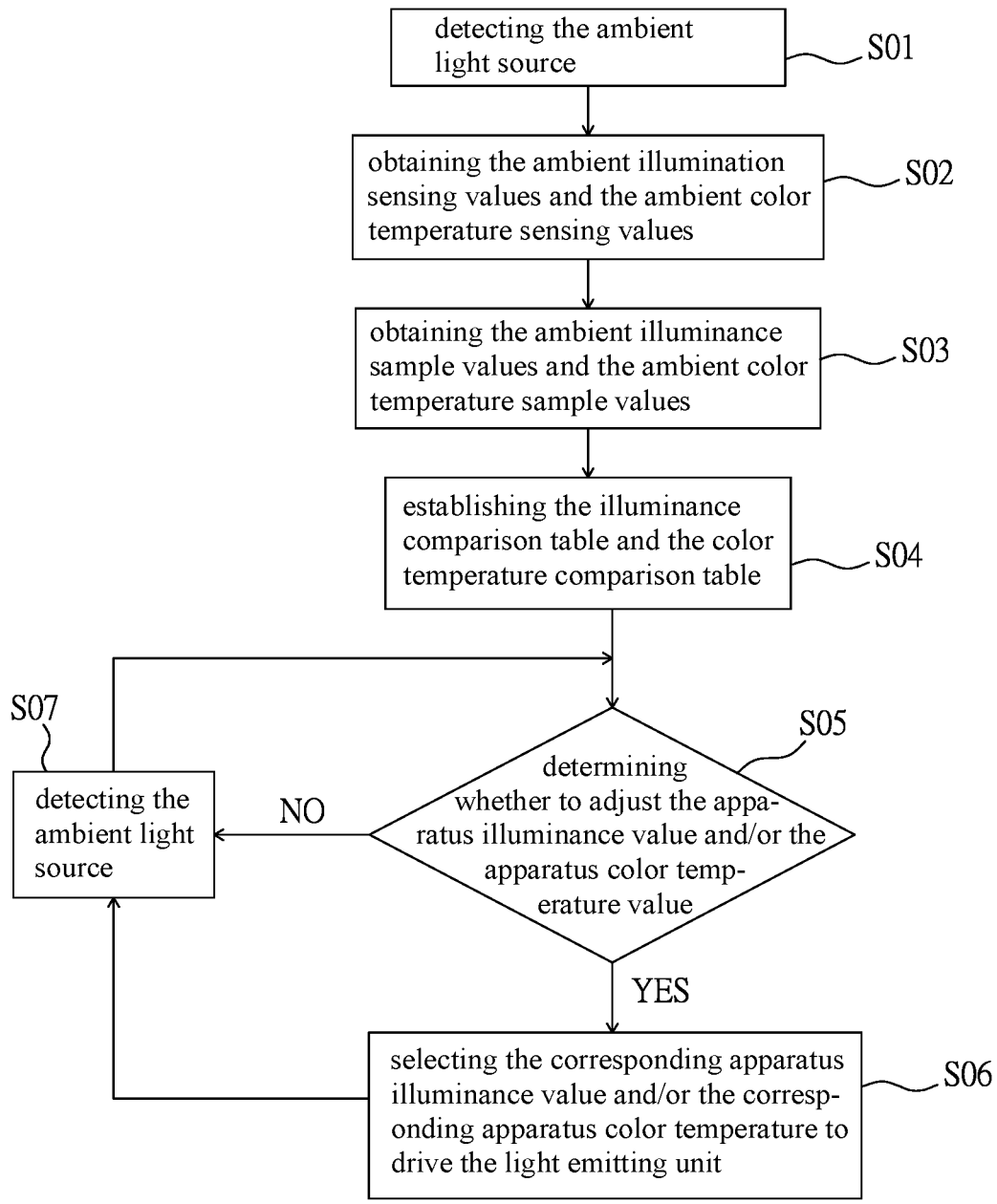
FIG. 4 is a flowchart showing the implementation steps of the intelligent light supplement method according to a preferred embodiment of the invention.

Next, please refer to FIG. 4 to illustrate the intelligent light supplement method of the video apparatus according to the embodiment of the invention. The video apparatus is, for example, the video apparatus 10 mentioned above. Before performing the intelligent light supplement method, the working directions of the camera 111 and the light sensing unit 121 are arranged toward the same direction. In other words, for example, the camera 111 captures the image in the first direction, and the light sensing unit 121 also faces the first direction to capture the ambient light source in that direction. The intelligent light supplement method includes steps S01 to S07.

Step S01 is to detect the ambient light source EL1 by the light sensing unit 121. The ambient light source detected by the light sensing unit 121 and the image captured by the camera 111 come from the same direction. Next, step S02 is to obtain a plurality of ambient illumination sensing values and a plural of ambient color temperature sensing values according to the ambient light source EL1.

Step S03 is to sample the ambient illumination sensing values and the ambient color temperature sensing values to obtain a plurality of ambient illuminance sample values and a plurality of ambient color temperature sample values. Since the ambient illumination sensing values or the ambient color temperature sensing values obtained by the light sensing unit 121 may have short-term incorrect values due to the detection error of the light sensing unit 121 itself or environmental changes, for example, in 10 pieces of the ambient illumination sensing values data, 9 pieces of data fall in 50~515 unit of illuminance (such as lumens), and 1 piece of data is 1000 unit of illuminance, which means that the data of 1000 unit of illuminance may be wrong, therefore, in this sampling step, this extreme ambient illumination sensing value will be excluded without sampling. Likewise, for the ambient color temperature sensing value, the extreme ambient color temperature sensing value among the ambient color temperature sensing values will be excluded without sampling. Here, the sampling step can be performed by the light source computing module 13.

Step S04 is to establish an illuminance comparison table according to the ambient illuminance sample values and a plurality of apparatus illuminance values and establish a color temperature comparison table according to the ambient color temperature sample values and a plurality of apparatus color temperature values. Wherein, the illuminance comparison table and the color temperature comparison table are generated by, for example, but not limited to, the light source computing module 13. To further illustrate, in the embodiment, the control of the apparatus illuminance and the apparatus color temperature is differentiated by level, for example, the first level illuminance is the output of 10 lumens and the first level color temperature is 2700K. In other words, each illuminance level corresponds to one illuminance generated by the light source output module 14 and each color temperature level corresponds to one color temperature generated by the light source output module 14. In one embodiment, the illuminance comparison table is established by matching an initial ambient illuminance sample value, the minimum level (for example, the first level) of an initial apparatus illuminance, and an initial apparatus illuminance value corresponding to the minimum level and obtaining the ambient illuminance sample value corresponding to each apparatus illuminance according to the relationship (such as the proportional relationship, which is not limited here) between the apparatus illuminance of each level and the apparatus illuminance of the minimum level. Among them, the term initial means, for example, the factory setting or the detection every time the apparatus is turned on. The color temperature comparison table is established by matching an initial ambient color temperature sample value, the minimum level (for example, the first level) of an initial apparatus color temperature, and an initial apparatus color temperature value corresponding to the minimum level and obtaining the ambient color temperature sample value corresponding to each apparatus color temperature according to the relationship (such as the proportional relationship, which is not limited here) between the apparatus color temperature of each level and the apparatus color temperature of the minimum level. Among them, the term initial means, for example, the factory setting or the detection every time the apparatus is turned on. In other embodiments, the content of the illuminance comparison table and its corresponding manner and the color temperature comparison table and its corresponding manner can be designed according to actual requirements, which are not limited herein.

Among them, the illuminance comparison table is shown in Table 1 as an example and the color temperature comparison table is shown in Table 2 as an example:

TABLE 1

| apparatus illuminance | 10 | 20 | 30 | 40 | 50 |
|---|---|---|---|---|---|
| illuminance level | 1 | 2 | 3 | 4 | 5 |
| ambient illuminance sampling value | 62.5 | 200 | 187.5 | 250 | 312.5 |

TABLE 2

| apparatus color temperature | 2700 | 3000 | 3200 | 3500 | 3700 |
|---|---|---|---|---|---|
| color temperature level | 1 | 2 | 3 | 4 | 5 |
| ambient color temperature sampling value | 2850 | 3167 | 3378 | 3694 | 3906 |

The level and numerical values of the above-mentioned comparison table are all exemplary rather than limiting. In addition, the above step S01 to step S04 is used to establish a reference illuminance comparison table and a reference color temperature comparison table, which can be performed in the initialization stage when the video apparatus 10 is turned on, or can be performed according to the instruction of the user, or can be performed when changes in the ambient light source are automatically sensed, which is not limited herein.

Step S05 is to determine whether to adjust the apparatus illuminance value and/or the apparatus color temperature value of the light emitting unit according to the ambient illumination sensing values and the ambient color temperature sensing values. Step S06 is performed if it is determined that adjustment is necessary and step S07 is performed if it is determined that adjustment is not necessary.

In the embodiment, the light source computing module 13 compares the ambient illumination sensing value with the content of the illuminance comparison table to obtain the corresponding apparatus illuminance value, next, it is compared whether the illuminance control signal of the video apparatus 10 currently driving the light emitting unit 143 is consistent with the apparatus illuminance value. If it matches, it means that the apparatus illuminance value of the video apparatus 10 does not need to be adjusted; if not, it means that the apparatus illuminance value of the video apparatus 10 needs to be adjusted. Similarly, the light source computing module 13 compares the ambient color temperature sensing value with the content of the color temperature comparison table to obtain the corresponding apparatus color temperature value, next, it is compared whether the color temperature control signal of the video apparatus 10 currently driving the light emitting unit 143 is consistent with the apparatus color temperature value. If it matches, it means that the apparatus color temperature value of the video apparatus 10 does not need to be adjusted; if not, it means that the apparatus color temperature value of the video apparatus 10 needs to be adjusted.

In step S06, if the determined result of step S05 is "Yes", the light source computing module 13 selects the corresponding apparatus illuminance value and/or the corresponding apparatus color temperature value in the illuminance comparison table and/or the color temperature comparison table and drives the light emitting unit 143 through the control unit 122, the rheostat unit 141, and the power conversion unit 142 accordingly. It is to be noted that when the illuminance of the apparatus light source needs to be adjusted, the apparatus illuminance value selected by the light source computing module is a target apparatus illuminance value. Therefore, the light emitting unit 143 needs to be adjusted from the current illuminance to the target illuminance corresponding to the target apparatus illuminance value, and the method adopted in the embodiment is a progressive adjustment (e.g., the adjustment method of the breathing light). Similarly, when the color temperature of the apparatus light source needs to be adjusted, the apparatus color temperature value selected by the light source computing module is a target apparatus color temperature value. Therefore, the light emitting unit 143 needs to be adjusted from the current color temperature to the target color temperature corresponding to the target apparatus color temperature value, and the method adopted in the embodiment is also the progressive adjustment.

In step S07, if the determined result of step S05 is "No", continue to detect the ambient light source and continue to obtain the ambient illumination sensing value and the ambient color temperature sensing value. Next, step S05 is performed again.

It should be noted that the above adjustment is performed by the video apparatus 10 to automatically adjust the illuminance and color temperature of the apparatus light source. In other embodiments, the user can also manually adjust the illuminance and color temperature, for example, the user issues an external illumination adjustment command or an external color temperature adjustment command to the video apparatus 10 through a key or wireless transmission. For example, when the user determines that the current illuminance is insufficient and adjusts the apparatus illuminance by one level up through the external illumination adjustment command, at this time, the correspondence between the ambient illuminance sample value and the apparatus illuminance value in the illuminance comparison table will all be adjusted up one level. For example, the current ambient illumination sensing value is 250 unit of illuminance (e.g., lumens) and the apparatus illuminance is 40 unit of illuminance, which corresponds to the fourth illuminance level, and the user adjusts the apparatus illuminance to 50 unit of illuminance of the fifth illuminance level through the external illumination adjustment command. Thereafter, when the ambient illumination sensing value detected by the light sensing unit 121 is 250 unit of illuminance, the correspondence in the illuminance comparison table will correspond to the apparatus illuminance value of the fifth illuminance level. In other words, the content of the illuminance comparison table will be modified, such as Table 3:

TABLE 3

| apparatus illuminance | 10 | 20 | 30 | 40 | 50 |
|---|---|---|---|---|---|
| illuminance level | 1 | 2 | 3 | 4 | 5 |
| ambient illuminance sample value | 50 | 100 | 150 | 200 | 250 |

In addition, the color temperature comparison table also has the above adjustment effect. For example, suppose the current ambient color temperature sensing value is 3100K and the apparatus color temperature should be 3000K, which corresponds to the second color temperature level. If the user adjusts the apparatus color temperature to 3200K of the third stage through the external color temperature adjustment command, thereafter, when the ambient color temperature sensing value detected by the light sensing unit 121 is the color temperature originally corresponding to the second level, the corresponding relationship in the color temperature comparison table will correspond to the apparatus color temperature value of the third level. In other words, the content of the color temperature comparison table will be modified, such as Table 4:

TABLE 4

| apparatus color temperature | 2700 | 3000 | 3200 | 3500 | 3700 |
|---|---|---|---|---|---|
| color temperature level | 1 | 2 | 3 | 4 | 5 |
| ambient color temperature sampling value | ~2505 | 2969 | 3167 | 3464 | 3662 |

It is to be noted that the above-mentioned adjustment method for the content of the comparison table after receiving the external illumination adjustment command and the external color temperature adjustment command is to shift the correspondence between all sample values and levels. However, in other embodiments, it can also be adjusted only for the sampling value corresponding to the level adjusted by the user. Taking the aforementioned content adjustment of the color temperature comparison table as an example, the color temperature comparison table can also only modify the color temperature level of the ambient color temperature sensing value at 3378K to correspond to the apparatus color temperature of the third level, without adjusting the color temperature levels corresponding to other ambient color temperature values. The above-mentioned adjustment method of the ambient color temperature sample value and the color temperature order in response to the external color temperature adjustment command can also be applied to the external illumination adjustment command.

Figure 5:
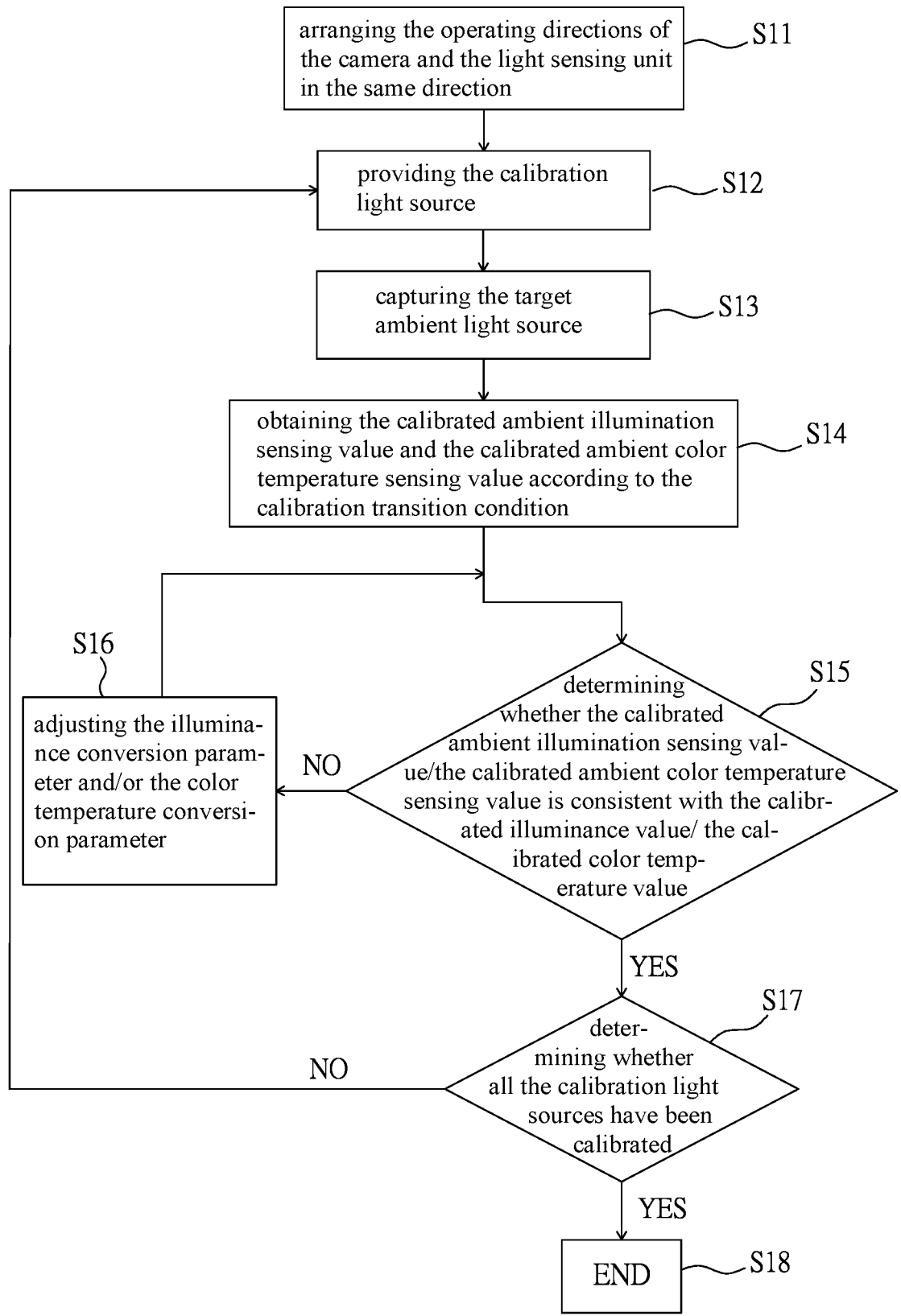
FIG. 5 is a flow chart showing the steps of calibration for the light sensing unit in the intelligent light supplement method.

In addition, it should be noted that in order to enable the light sensing unit 121 to continue to be used on the video apparatus 10, it must be calibrated to maintain its stability. Herein, the intelligent light supplement method also includes calibrating the light sensing unit 121 to generate the correct stimulus (X, Y, Z, IR1, IR2), and the calibrating steps include step S11 to step S18 as shown in FIG. 5.

Step S11 is to arrange the operating directions of the camera 111 and the light sensing unit 121 in the same direction.

Step S12 is to provide a calibration light source within the sensing range of the light sensing unit 121. Among them, the calibration light source has a calibrated illuminance value and a calibrated color temperature value.

Step S13 is to capture a target ambient light source by the light sensing unit 121 under the environment of the calibration light source.

Step S14 is to convert the target ambient light source into a calibrated ambient illumination sensing value and a calibrated ambient color temperature sensing value according to a calibration transition condition. In the embodiment, the light sensing unit 121 obtains the stimulus ($X_{CS}$, $Y_{CS}$, $Z_{CS}$, $IR1_{CS}$) according to the detected target ambient light source, and then uses a color space conversion method (calibration matrix) to obtain the calibrated $X'_{CS}$, calibrated $Y'_{CS}$, and calibrated $Z'_{CS}$, where the calibrated $Y'_{CS}$ is the calibrated ambient illumination sensing value. Finally, after chromaticity conversion and color temperature conversion according to the values of calibrated $X'_{CS}$, calibrated $Y'_{CS}$, and calibrated $Z'_{CS}$, the calibrated ambient color temperature sensing value is obtained.

Step S15 is to determine whether the calibrated ambient illumination sensing value is consistent with the calibrated illuminance value and determine whether the calibrated ambient color temperature sensing value is consistent with the calibrated color temperature value. Step S16 is performed if the determined result is not consistent and step S17 is performed if the determined result is consistent. The above determined result is inconsistent when the tolerance between the calibrated ambient illumination sensing value and the calibrated illuminance value exceeds a preset illuminance tolerance value or when the tolerance between the calibrated ambient color temperature sensing value and the calibrated color temperature value exceeds a preset color temperature tolerance value.

Step S16 is to adjust the illuminance conversion parameter of the calibration transition conditions when the tolerance between the calibrated ambient illumination sensing value and the calibrated illuminance value exceeds the preset illuminance tolerance value. In addition, step S16 may also include adjusting the color temperature conversion parameter of the calibration transition conditions when the tolerance between the calibrated ambient color temperature sensing value and the calibrated color temperature value exceeds the preset color temperature tolerance value. Next, step S15 is performed again.

Step S17 is to determine whether all the calibration light sources have been calibrated. If the result is "YES", step S18 is performed to end the calibration of the light sensing unit, and if the result is "NO", step S12 is performed again to provide another calibration light source. It should be noted that since the light sensing unit may be used in various light source environments, it will be calibrated for different light sources one by one. In short, when there are 10 kinds of the calibration light sources and steps S12 to S17 will be repeated 10 times.

The foregoing descriptions for all embodiment as disclosed are merely for exemplary and explanatory purposes but are not intended to limit or depart from the scope and spirit of the present invention. Any change or modification to the foregoing descriptions and embodiments which still maintain their equivalents, should all be enclosed or covered by the scope of the appended claims.

What is claimed is:

1. An intelligent light supplement method, which is applied to a video apparatus having a camera, a light sensing unit, and a light emitting unit, wherein the camera and the light sensing unit are arranged in the same direction, comprising:
   detecting an ambient light source by the light sensing unit;
   obtaining a plurality of ambient illumination sensing values and a plurality of ambient color temperature sensing values according to the ambient light source;
   sampling the ambient illumination sensing values and the ambient color temperature sensing values to obtain a plurality of ambient illuminance sample values and a plurality of ambient color temperature sample values;
   establishing an illuminance comparison table according to the ambient illuminance sample values and a plurality of apparatus illuminance values and establishing a color temperature comparison table according to the ambient color temperature sample values and a plurality of apparatus color temperature values;
   determining whether to adjust the apparatus illuminance value and/or the apparatus color temperature value of the light emitting unit according to the ambient illumination sensing values and the ambient color temperature sensing values; and
   selecting the corresponding apparatus illuminance value and/or the apparatus color temperature value from the illuminance comparison table and/or the color temperature comparison table and driving the light emitting unit accordingly if the adjustment is required.

2. The intelligent light supplement method of claim 1, wherein the step of sampling from the ambient illumination sensing values and the ambient color temperature sensing values, further comprising:
excluding the extreme ambient illumination sensing value in the ambient illumination sensing values and excluding the extreme ambient color temperature sensing values in the ambient color temperature sensing values.

3. The intelligent light supplement method of claim 1, wherein the apparatus illuminance value selected from the illuminance comparison table is a target apparatus illuminance value, and the light emitting unit is gradually adjusted from a current illuminance to a target illuminance corresponding to the target apparatus illuminance value, and the apparatus color temperature value selected from the color temperature comparison table is a target apparatus color temperature value, and the light emitting unit is gradually adjusted from a current color temperature to a target color temperature corresponding to the target apparatus color temperature value.

4. The intelligent light supplement method of claim 1, further comprises calibrating the light sensing unit, and the calibration step comprising:
providing a calibration light source in a sensing range of the light sensing unit, which has a calibrated illuminance value and a calibrated color temperature value;
capturing a target ambient light source in the environment of the calibration light source by the light sensing unit;
converting the target ambient light source into a calibrated ambient illumination sensing value and a calibrated ambient color temperature sensing value according to a calibration transition condition; and
comparing the calibrated ambient illumination sensing value with the calibrated illuminance value and comparing the calibrated ambient color temperature sensing value with the calibrated color temperature value.

5. The intelligent light supplement method of claim 4, further comprising:
adjusting an illuminance conversion parameter of the calibration transition condition when the tolerance value between the calibrated ambient illumination sensing value and the calibrated illuminance value exceeds a preset illumination tolerance value; and
adjusting a color temperature conversion parameter of the calibration transition condition when the tolerance value between the calibrated ambient color temperature sensing value and the calibrated color temperature value exceeds a preset color temperature tolerance value.

6. A video apparatus with light compensation function, comprising:
an image capturing module having a camera, which is disposed towards a first direction and captures the image of the first direction;
a light source input module having a light sensing unit, which is disposed in the same direction as the image capturing module and receives the ambient light source;
a light source computing module, which is electrically connected to the light source input module and compares the ambient light source with a content of an illuminance comparison table to generate an illuminance control signal corresponding to an apparatus illuminance value and/or compares the ambient light source with a content of a color temperature comparison table to generate a color temperature control signal corresponding to an apparatus color temperature value; and
a light source output module, which has a light emitting unit and drives the light emitting unit according to the illuminance control signal and/or the color temperature control signal, wherein the light source output module further comprising:
a rheostat unit, which receives the illuminance control signal and/or the color temperature control signal; and
a power conversion unit, which is electrically connected to a power supply module, the rheostat unit, and the light emitting unit, respectively and outputs a driving power to drive the light emitting unit according to the output of the rheostat unit and the output of the power supply module.

7. The video apparatus of claim 6, wherein the light source input module further comprises a control unit, which is electrically connected with the rheostat unit, the light sensing unit and the light source computing module respectively, transmits the ambient light source to the light source computing module, and receives and outputs the illuminance control signal and/or the color temperature control signal transmitted by the light source computing module.

8. An intelligent light supplement device, comprising:
a light source input module having a light sensing unit, which receives an ambient light source;
a light source computing module, which is electrically connected to the light source input module, compares the ambient light source with a content of an illuminance comparison table to generate an illuminance control signal corresponding to an apparatus illuminance value, and/or compares the ambient light source with a content of a color temperature comparison table to generate a color temperature control signal corresponding to an apparatus color temperature value; and
a light source output module, which has a light emitting unit and drives the light emitting unit according to the illuminance control signal and/or the color temperature control signal, wherein the light source output module further comprising:
a rheostat unit, which receives the illuminance control signal and/or the color temperature control signal; and
a power conversion unit, which is electrically connected to a power supply module, the rheostat unit, and the light emitting unit, respectively and outputs a driving power to drive the light emitting unit according to the output of the rheostat unit and the output of the power supply module.

9. The intelligent light supplement device of claim 8, wherein the light source input module further comprises a control unit, which is electrically connected with the rheostat unit, the light sensing unit and the light source computing module respectively, transmits the ambient light source to the light source computing module, and receives and outputs the illuminance control signal and/or the color temperature control signal transmitted by the light source computing module.

* * * * *